March 31, 1959     H. A. HALEY     2,879,542
SPINNING BATH CIRCULATOR

Filed March 25, 1953     2 Sheets-Sheet 1

United States Patent Office 2,879,542
Patented Mar. 31, 1959

2,879,542

SPINNING BATH CIRCULATOR

Harold A. Haley, Parkersburg, W. Va., assignor to American Viscose Corporation, Philadelphia, Pa., a corporation of Delaware Application March 25, 1953, Serial No. 344,628

2 Claims. (Cl. 18—8)

This invention relates to an improved liquid transfer system for maintaining a liquid at uniform temperature and concentration in the various portions of a horizontally elongate container, particularly in the instance wherein such liquid is subject to continuous partial replacement on account of the loss or gain of heat by the liquid or the chemical change of materials dissolved therein.

The present invention is particularly applicable to conventional viscose yarn-spinning machines of the type wherein a large plurality of spinnerets are supported and spaced lengthwise below the surface of the acid path within a narrow elongate tank extending substantially the entire length of the machine. The material extruded from each spinneret passes upwardly to a godet along an inclined path having an angle sufficiently small with respect to the horizontal to provide the necessary length of yarn immersion in the bath. These paths are parallel and extend lengthwise as well as upwardly within the tank. When the yarns are simultaneously advancing along respective paths, a considerable accumulative pumping effect is produced in the bath tending to carry the liquid thereof toward one end of the tank. Such pumping action is relied upon to mix the fresh liquid supply of the bath with the partially used liquid thereof. As spinning machines are usually constructed, the fresh liquid is introduced into the bath by a header or manifold which extends lengthwise along the bottom of the container and has laterally extending nozzles through which fresh coagulant is supplied to the bath. The tank ordinarily has a plurality of overflow ducts or weirs which connect with a collection pipe under the tank whereby used coagulant may pass from the trough. In order that fresh coagulant of elevated temperature and chemical content may be supplied to the tank in sufficient quantity to assure that the temperature and concentration of active ingredients of the bath is maintained uniform throughout the entire tank, the delivery of fresh coagulant from the outlets of the header is substantial and frequently sufficient to create adverse current conditions within the tank. Moreover, if a sufficient quantity of fresh coagulant is supplied to result in uniform temperature and concentrations within the tank, the cost and complexity of the auxiliary tanks, heaters, piping installation required is increased and operating costs thereof are increased. The considerable variation in the current and concentration of the bath to which the various yarns being produced are subjected results in a lack of uniformity among such yarns as to physical properties and dye acceptance.

It is an object of the present invention to provide apparatus by which greater uniformity may be obtained in the temperature and concentration of, for example, a spinning bath for coagulating the output of a plurality of spinnerets. It is also an object to provide improved circulation within such a spinning bath as to maintain in suspension fine solid materials that ordinarily tend to separate out of a spinning bath without creating such currents within the bath as to effect the quality of yarn produced by the spinning apparatus named in the foregoing object, such improved circulation being effective in eliminating normally placid regions of poor circulation within the bath that occur within the conventional spinning bath tanks. Another object is to utilize more efficiently the dissolved materials in the bath and to increase their availability to the filament surfaces of the strands being formed therein. Other objects, features, and advantages will become apparent from the following description of the invention and the drawings relating thereto in which Fig. 1 is a fragmentary diagrammatic elevation illustrating a portion of a spinning machine;

The invention, in brief, concerns an apparatus of unitary design for use within spinning bath containers, especially those in present use, and adapted to be supported therein for the disposition of intake and exhaust ducts of the apparatus within the bath lengthwise of the container. The apparatus comprises an injection system actuated by a jet of fresh coagulating liquid which is discharged from a flow-regulating nozzle or orifice into the exhaust duct. The portion of the intake duct immediately adjacent the orifice extends rearward thereof and forms a contiguous passage with the exhaust duct. Both the intake duct and the exhaust duct are formed with respect to the orifice to extend lengthwise of the container and may preferably extend into adjacent relationship with each of the spinnerets. Apertures extending through the lateral walls of the ducts are arranged preferably as to size, spacing, and number with respect to the length of each duct to effect substantially uniform withdrawal and discharging of liquid throughout the length of the container, and particularly with respect to the regions of the bath adjacent the spinnerets.

Figure 1:
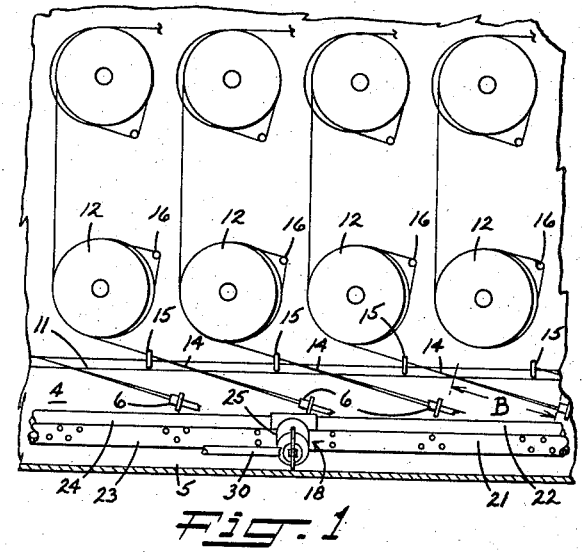
Figure 2:
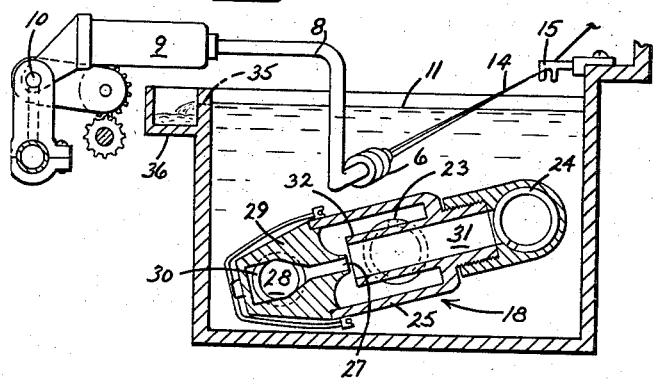
Fig. 2 is a sectional view taken transversely of the spinning tank.

Fig. 1 illustrates in elevational and transverse section a portion of a machine for spinning a plurality of yarns comprising a tank 4 having a floor 5, a plurality of spinnerets 6, and an assembly for supporting each spinneret as shown in Fig. 2 comprising a rounder 8, a filter 9 having an extension whereby the filter may pivot with respect to a shaft 10 to swing the spinneret into and out of the bath maintained in the tank 4 at a level 11. The spinnerets are normally positioned in the bath to produce parallel paths of the material extruded therefrom extending to respective godets. The paths may be aligned in the manner as shown wherein they extend slightly upwardly from the spinneret at a small angle with the horizontal and the longitudinal direction of the tank 4. The paths of the strands are substantially tangential with respect to the godets 12; the axes of such godets being thus canted at a small angle from the horizontal and also at a small angle from a plane passing transversely through the machine normal to its longitudinal direction.

The output of each spinneret, after initial coagulation and regeneration within the spinning bath, becomes a strand 14 which is aligned for a predetermined portion of the periphery of the godet 12 to which it must pass, by a guide 15. When the strand extends for one or more wraps about the godet, each wrap is extended over a guide 16 to advance it to a different portion of the periphery of the godet 12, thus preventing superposition of the wraps on the godet and damage by abrasion to the temporarily nascent and tender yarn of this stage. The guides 15 and 16 also function advantageously in stripping bath materials from the yarn.

As a departure from conventional spinning machine construction, a coagulant-feeding and bath-circulating device 18 is supported along the bottom of the tank 4 on a plurality of cleats. The device 18, as shown in Figs. 1 and 2, is generally H-shaped and comprises four legs 21, 22, 23, and 24, of which 21 and 23 are intake ducts and 22 and 24 are exhaust ducts. Each of these ducts is preferably closed at its end and has apertures through its lateral walls so that liquid may be discharged or received in a direction that is lateral with respect to the length of the legs and the tank. The intake ducts 21 and 23 receive liquid from the bath through the apertures of their lateral walls and conduct such liquid to the injection pump 25 which connects the intake ducts and the exhaust ducts. The liquid received by the intake ducts is propelled through the pump 25 and into the exhaust ducts by a jet issuing from an orifice 27 constituting the outlet of a chamber 28 of the cap 29. An exterior supply tube 30 is connected with the cap in communication with the chamber 28. The tube 30 is connected with a supply of liquid coagulant maintained under such pressure as to produce a jet of high velocity issuing from the orifice 27.

The action of such a jet through the narrow channel 31 provided by the internal tube 32 pumps or draws liquid from the ducts 21 and 23 in quantity which greatly exceeds that discharged from the tube 30. In the practice of the present invention as applied to the feeding and the circulating of spinning bath liquid in the manufacturing of viscose yarn, a suggested ratio between the recirculated bath and the fresh liquid is three parts of liquid supplied through the ducts 21 and 23 to one part of liquid discharged from the tube 30, the rates of liquid transferred being approximately five gallons per minute from the tube 30 and the total liquid discharged by the exhaust ducts 22 and 24 being around 20 to 25 gallons per minute. Used spinning bath liquid is discharged from the tank through notches 35 into the trough 36 at the same rate as fresh liquid is supplied through the tube 30. This trough is connected with a drain not shown.

Figure 3:
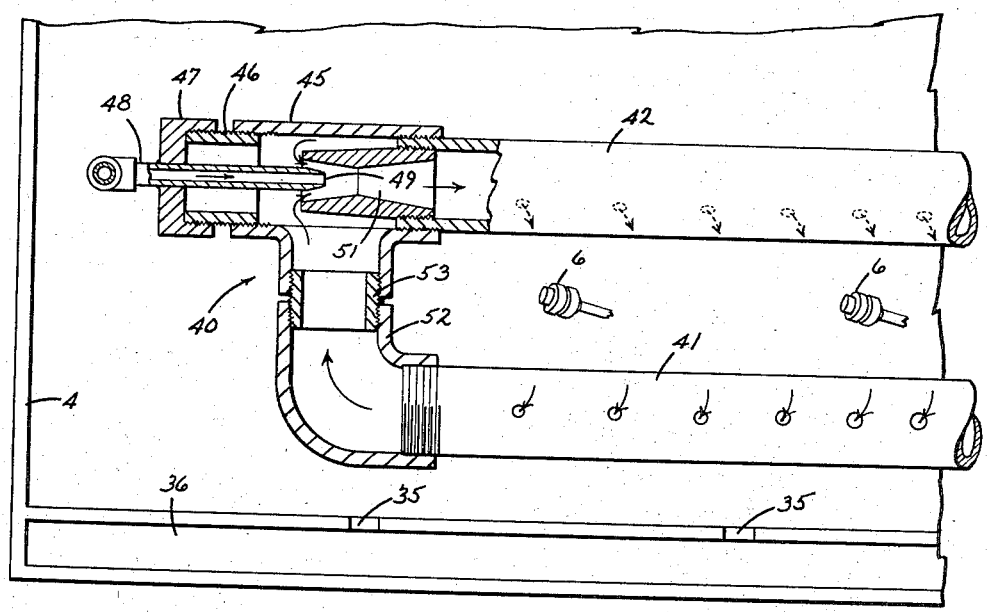
Fig. 3 is a plan view, partially in section, illustrating a modified circulating device.

Fig. 3 illustrates a modified circulating and feeding device 40 of which the injector-type pump is located between the ends of an intake duct 41 and exhaust duct 42 which extends the entire length of the tank 4. The device 40 has the same principles of operation as the device 18, namely, that a high velocity jet of the fresh coagulant is used to circulate a larger quantity of bath than that delivered by the jet, and the bath is circulated by receiving liquid therefrom into the intake duct 41 of the device along its entire length. The device 40 may be economically fabricated, primarily from standard pipe materials. As shown, the device 40 comprises a T-fitting 45 into one end of which is screwed a threaded end-portion of the exhaust duct, tube or pipe 42; a nipple 46 is screwed into the other end of the T-fitting; a pipe cap 47 functions as a closure for the nipple. A tube 48 extends axially through the cap to provide the orifice 49 of the injection pump system. Secured within the end of the distribution pipe 42 in threaded relationship or otherwise, is a bushing having a necked passageway 51 which cooperates with the orifice 49 for pumping and recirculating the liquid therethrough provided partly by the jet discharged from the orifice and the liquid pulled by suction through the intake duct 41, elbow 52, and the nipple 53 which connects the pipe 41 to the T-fitting 45. When the length of the spinning tank is such as to cause difficulty in recirculating the bath by the device shown in Fig. 3, two or more of such devices may be placed end to end in a tank to efficiently circulate the liquid contents thereof.

The devices 18 and 40 may be constructed of any materials chemically resistant to the liquid being handled. In the spinning of viscose yarn, such a device may be constructed of lead, but preferably from some of the chemically stable synthetic organic resins having a waxy finish which renders objects fabricated therefrom resistant to deposition of sludge. Since this latter class of materials is characterized by low heat transfer coefficients, it is particularly advantageous to construct the distribution tubes, e.g., the pipe 42 from a composition consisting essentially of one of such materials, as polyethylene, polychlorotrifluoroethylene, or polyacrylonitrile. The organic materials available are numerous and include compositions of more complex formulation such as the one sold under the trademark "Uscolite" which comprises a mixture of butadiene polymer with a copolymer of styrene and acrylonitrile from which the tubes of one successful embodiment of the invention were fabricated. The construction of the injection pump portions of the device may be compacted somewhat by eliminating the nipples 46 and 53 and joining the cap 47 and the elbow 52 to the T 45 as by welding, or by trimming the threaded portions of the fittings.

Figure 4:
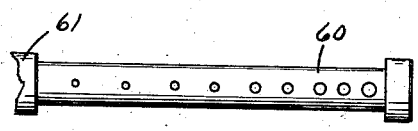
Fig. 4 is an exterior view of a member adapted to receive or discharge liquid which may constitute one or more portions of the circulator illustrated in Figs. 1 and 3.

Fig. 4 illustrates the manner in which the wall of an exhaust or intake duct of the devices 18 and 40 may be perforated. It will be noted that the apertures of the duct 60 are progressively larger in the longitudinal direction of the duct toward the right. This is the direction leading away from the fitting 61 which may be a portion of the injection pump of either device. The apertures are also spaced progressively closer together in the same direction. Thus, the pattern, number, and size of the apertures may be changed or graduated as suggested by Fig. 1 to provide increasing facility with which liquid may communicate between the interior region of the duct and the region within the bath exteriorly of the duct. The need for this progressive increase in the portions of the walls displaced by the apertures is due to the desirability of withdrawing or discharging of uniform quantities of liquid into or out of, respectively, the device throughout all longitudinally spaced sections of the tank. For example, the suction in any one of the intake ducts is greatest in the end portion adjacent the injection pump. Therefore, the size of the holes in such portions may be smaller or farther apart than those holes farther away from the injection pump. Conversely, in the exhaust ducts, the pressure of the liquid flowing from the injection pump will be greatest in the sections of the exhaust ducts closest to the pump and, therefore, smaller holes, or holes spaced farther apart, will suffice at this point than in the sections of the duct farther away from the pump to obtain equal rates of discharge of liquid along the entire length of the exhaust ducts.

Figure 5:
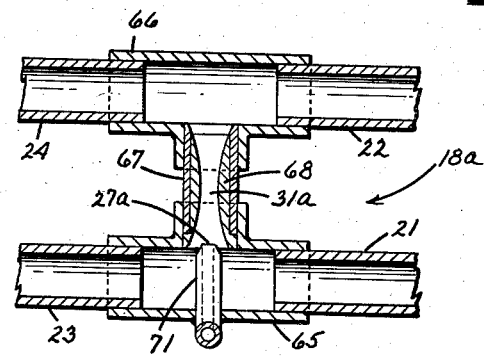
Fig. 5 is a fragmentary section of a modified circulator.

As shown in Fig. 5, and where sufficient room exists in the coagulating tank in a transverse direction, the central portion of the device 18 may be constructed almost entirely of pipe fittings. The device 18a comprises two T-fittings 65 and 66, a nipple 67, and pipes which constitute the ducts 21, 22, 23, and 24. A bushing 68 is fabricated from a corrosion-resistant material such as lead, or a chemically stable synthetic organic resin such as a polyethylene, polymers of tetrafluoroethylene, chlorotrifluoroethylene, or vinyl chloride, and shaped exteriorly to fit the interior surface of the nipple 67 while being shaped interiorly to obtain a desired throughput for a predetermined rate of discharge and velocity of the jet developed in the orifice 27a. The liquid-discharging end of the sleeve and the adjacent end of the nipple 25 may be contoured to provide a smoothly continuous contour of the passageway 31a shown. The orifice 27a is the terminus of a tube 21 extending through the T-fitting 65 and attached thereto as by welding.

Figure 6:
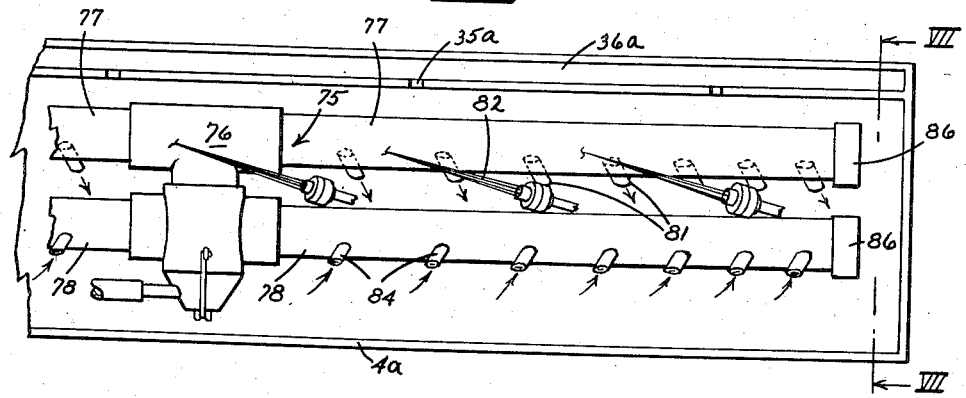
Fig. 6 is a fragmentary plan view of a modified circulator and the tank in which it is disposed.
Figure 7:
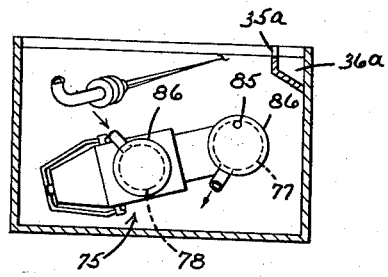
Fig. 7 is a sectional elevation taken along line VII—VII of Fig. 6.

Figs. 6 and 7 illustrate in plan view and section view, respectively, a system constructed in accordance with the principles of the present invention for promoting the circulation of the coagulant bath of a multiple spinneret spinning machine. The essential feature of this embodiment is to provide intake and discharge ports of the circulator which are aligned and inclined with respect to the longitudinal direction of the bath container to discharge and to receive the liquid of the bath in such a manner as to produce a plurality of small currents which counteract the current induced lengthwise within the spinning tank by the movement of the strands being coagulated within the bath lengthwise within the tank. Fig. 6 illustrates by plan view portions of a device 75 having an injection pump 76 such as hereinbefore described with respect to Fig. 2, exhaust tubes 77, and intake tubes 78. The tubes are provided with short nozzles inclined with respect to the longitudinal and squarely transverse directions of the tubes. The nozzles 81 of the exhaust tubes extend away from the exhaust tubes at an inclination toward the left end of the tank as viewed in Fig. 6 so that the outcoming liquid will oppose the current produced within the bath toward the right by the strands 82.

The nozzles 84 of the intake tubes 78 extend away from the tubes at an inclination toward the right, as viewed in Fig. 6, whereby the liquid pulled into these nozzles tends also to oppose the current produced by the strands 82 lengthwise of the tank. While the inclination of the nozzles of the intake tubes will be opposite (with respect to the crosswise direction of the intake and exhaust tubes) to that of the nozzles for the exhaust tubes, the angles adopted for such nozzles will vary according to the spinning conditions, the design of the tank and ancillary equipment, and the rates of spinning and bath recirculation.

It is possible to provide inclined nozzles solely on the intake ducts which counteract the drag effect of the strands on the bath while providing only plain orifices on the outlet ducts, and vice versa. An inclination of the nozzles and the rate of bath recirculation may be adjusted to obtain satisfactory countercurrents from the nozzles to prevent appreciable transfer of the bath liquid lengthwise of the tank. As shown in Fig. 7, an aperture 85 may be provided in the end caps 86 of the ducts 77 to permit the discharge of air or other gas introduced into the distributor 75. The hole 85 coincides in level with the upper portion of the passageway through the adjacent duct 77. The embodiment of Figs. 6 and 7 is merely illustrative of the one arrangement for providing a bath circulatory system by which the principle may be carried out of producing small streams of liquid flowing into intake ducts and small streams flowing out of the exhaust ducts that are directioned so as to oppose a current in the main body of the liquid passing lengthwise of the ducts. It is obvious that small design changes may be made in the general arrangement of the distributor to obtain liquid circulation substantially according to this principle.

While a preferred embodiment of the invention has been shown and described, it is to be understood that changes and variations may be made without departing from the spirit and scope of the invention as defined in the appended claims.

I claim:

1. In combination with a horizontally elongated tank, a row of spinnerets for extruding viscose therethrough, a coagulating spinning bath in said tank at a level sufficiently high to cover said spinnerets, and means for withdrawing coagulated filaments from said bath, the apparatus comprising an intake duct and an exhaust duct extending parallel to the row of spinnerets and below the surface of the bath, a supply conduit terminating in an orifice for discharging a jet of bath liquid into the exhaust duct, duct means joining the exhaust duct adjacent said orifice so as to permit liquid carried by the intake duct to enter the exhaust duct along with liquid discharged through said supply orifice, a row of ports in the exhaust duct facing counter to the spinnerets so that the bath liquid exhausted through these ports runs countercurrent to the viscose issuing from the spinnerets, and a row of ports in the intake duct facing away from the spinnerets so that the spin bath solution is drawn into these ports countercurrent to the flow of viscose issuing from the spinnerets, whereby the current induced in the spinning bath by the combined effluent from the spinnerets and which tends to flow concurrently therewith is counteracted by the flow of liquid through the aforesaid ports.

2. In an artificial yarn spinning machine, in combination with a horizontally elongated tank containing a spinning bath below the surface of which a plurality of spinnerets discharge a plurality of streams of filament-forming solution which coagulate to form filaments moving in parallel paths and generally lengthwise of the tank whereby currents are set up in the spinning bath which currents tend to cause the bath as a whole to move toward one end of the tank; apparatus comprising an intake duct and an exhaust duct extending through the spinning bath lengthwise of the tank, communicating means interconnecting said intake duct and the exhaust duct whereby spinning bath liquid may flow from said intake duct into said exhaust duct, a conduit for supplying fresh spinning bath, said conduit terminating in a discharge orifice aimed into said exhaust duct adjacent said communicating means for discharging a jet of spinning bath liquid into said exhaust duct, said jet of spinning bath liquid serving to draw spinning bath from said intake duct and create a circulation of spinning bath liquid from said intake duct to said exhaust duct, said ducts having spaced ports in their respective walls, and means associated with the ports of at least one of said ducts for directing the spinning bath liquid passing therethrough in a direction which counteracts the currents set up by the streams of filament-forming solution issuing from the spinnerets.

References Cited in the file of this patent

UNITED STATES PATENTS

| | | |
|---|---|---|
| Re. 16,314 | Kenney | Apr. 6, 1926 |
| 1,775,896 | Earman | Sept. 16, 1930 |
| 2,184,144 | Huttinger | Dec. 19, 1939 |
| 2,322,087 | Atwood | June 15, 1943 |
| 2,550,808 | Hays | May 1, 1951 |

FOREIGN PATENTS

| | | |
|---|---|---|
| 45,013 | Denmark | Dec. 21, 1931 |
| 405,178 | Great Britain | Feb. 1, 1934 |